US010573083B2

(12) United States Patent
Kobayashi et al.

(10) Patent No.: US 10,573,083 B2
(45) Date of Patent: Feb. 25, 2020

(54) NON-TRANSITORY COMPUTER-READABLE STORAGE MEDIUM, COMPUTER-IMPLEMENTED METHOD, AND VIRTUAL REALITY SYSTEM

(71) Applicant: FUJITSU LIMITED, Kawasaki-shi, Kanagawa (JP)

(72) Inventors: Hiroyuki Kobayashi, Kawasaki (JP); Koichiro Niinuma, Kawasaki (JP); Masayuki Nishino, Hino (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/128,895

(22) Filed: Sep. 12, 2018

(65) Prior Publication Data

US 2019/0088024 A1 Mar. 21, 2019

(30) Foreign Application Priority Data

Sep. 15, 2017 (JP) .................................. 2017-178115

(51) Int. Cl.
*G06T 19/00* (2011.01)
*G06T 7/73* (2017.01)
(Continued)

(52) U.S. Cl.
CPC ............ *G06T 19/006* (2013.01); *G06F 3/011* (2013.01); *G06T 7/246* (2017.01); *G06T 7/593* (2017.01); *G06T 7/73* (2017.01); *H04N 13/117* (2018.05); *H04N 13/239* (2018.05); *H04N 13/366* (2018.05); *G06T 2207/10012* (2013.01); *G06T 2207/10021* (2013.01);
(Continued)

(58) Field of Classification Search
CPC ......... G06T 19/006; G06T 7/246; G06T 7/73; G06T 7/593; G06T 2207/30204; G06T 2207/10012; G06T 2207/30196; H04N 13/204
See application file for complete search history.

(56) References Cited

U.S. PATENT DOCUMENTS

2017/0161957 A1* 6/2017 Yajima ............... G06K 9/00355
2017/0309071 A1* 10/2017 Benko ..................... G06F 3/011

FOREIGN PATENT DOCUMENTS

JP 11-136706 5/1999

* cited by examiner

*Primary Examiner* — Chong Wu
(74) *Attorney, Agent, or Firm* — Fujitsu Patent Center

(57) ABSTRACT

A non-transitory computer-readable storage medium storing a program that causes a computer to execute a process including estimating a first three-dimensional position of a wearable display device and a first arrangement of the wearable display device, estimating a second three-dimensional position of the physical object and a second arrangement of the physical object;
estimating a third three-dimensional position of a specified body part of a person, determining whether a positional relationship between the physical object and the specified body part satisfies a criteria, displaying a virtual target object with a display position and a display arrangement determined based on the second three-dimensional position and the second arrangement when the positional relationship satisfies the criteria, and displaying the virtual target object with a display position and a display arrangement determined based on the first three-dimensional position and the first arrangement when the positional relationship does not satisfy the criteria.

19 Claims, 15 Drawing Sheets

(51) Int. Cl.
   *G06T 7/593*   (2017.01)
   *G06T 7/246*   (2017.01)
   *H04N 13/117*  (2018.01)
   *H04N 13/239*  (2018.01)
   *H04N 13/366*  (2018.01)
   *G06F 3/01*    (2006.01)
   *H04N 13/204*  (2018.01)
   *H04N 13/383*  (2018.01)

(52) U.S. Cl.
   CPC ............... *G06T 2207/30196* (2013.01); *G06T 2207/30204* (2013.01); *G06T 2207/30208* (2013.01); *H04N 13/204* (2018.05); *H04N 13/383* (2018.05)

NON-TRANSITORY COMPUTER-READABLE STORAGE MEDIUM, COMPUTER-IMPLEMENTED METHOD, AND VIRTUAL REALITY SYSTEM

CROSS-REFERENCE TO RELATED APPLICATION

This application is based upon and claims the benefit of priority of the prior Japanese Patent Application No. 2017-178115, filed on Sep. 15, 2017, the entire contents of which are incorporated herein by reference.

FIELD

The embodiments discussed herein are related to a non-transitory computer-readable storage medium, a computer-implemented method, and a virtual reality system.

BACKGROUND

In evaluation of a product design and the like, it is currently common to perform evaluation using a physical object (mock-up) close to a product. However, monetary cost and time cost to create such a mock-up become a major problem.

In order to solve this problem, it is just beginning to be proposed to evaluate a design and the like without a mock-up by utilizing a virtual reality (VR) system.

However, in most of the VR systems for design evaluation, products may be viewed but not actually touched for evaluation. In design evaluation, it is important to actually touch a product for evaluation.

Therefore, it is conceivable to apply so-called mixed reality (MR) wherein actual images are taken into a virtual space with a camera attached to a head mounted display (HMD). As a conventional technology related to MR, for example, there has been proposed a device that produces mixed reality by accurately filling in the gaps for a player moving across a wide range. This device includes: a work station having a plurality of markers arranged at known positions; a posture sensor attached to the player to detect the posture of the player's head; and a camera configured such that at least one of the markers comes into sight. This device detects the head position based on output from the posture sensor, and also corrects the detected head position signal by detecting the position of the camera through image processing of image signals from the camera. The device further generates a virtual image so as to produce mixed reality at a viewpoint position corresponding to the corrected head position.

Related techniques are disclosed in, for example, Japanese Laid-open Patent Publication No. 11-136706.

SUMMARY

According to an aspect of the invention, a non-transitory computer-readable storage medium storing a program that causes a computer to execute a process, the process including estimating, by a first detection device disposed in a real space, a first three-dimensional position of a wearable display device and a first arrangement of the wearable display device including a screen configured to display an image indicating a virtual space including a virtual target object corresponding to a physical object located in the real space, the first detection device tracking the first three-dimensional position and the first arrangement, estimating, by a second detection device disposed on the wearable display device, a second three-dimensional position of the physical object and a second arrangement of the physical object, the second detection device tracking an area having a specified feature corresponding to the physical object in the real world, estimating a third three-dimensional position of a specified body part, in the real space, of a person wearing the wearable display device, determining whether a positional relationship in the real space between the physical object and the specified body part satisfies a predetermined criteria based on the second three-dimensional position and the third three-dimensional position, displaying, on the screen, the virtual target object with a display position and a display arrangement determined based on the second three-dimensional position and the second arrangement when the positional relationship satisfies the predetermined criteria, and displaying, on the screen, the virtual target object with a display position and a display arrangement determined based on the first three-dimensional position and the first arrangement when the positional relationship does not satisfy the predetermined criteria.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, although a VR tacking sensor (posture sensor in the conventional technology) may acquire, with certain accuracy, values such as the position and direction of an HMD worn by a user, a positional difference between a target captured by a camera and a target in a virtual space gives the user a feeling of strangeness in MR. Particularly, when the user tries to touch the target, a difference between visual perception and tactile perception occurs such that he/she reaches out to the target in the virtual space but may not actually touch the target. Note that, when only a virtual object is displayed without any actual object taken into the virtual space, a positional difference between the actual target and the target in the virtual space does not have much influence on the user.

Figure 15:
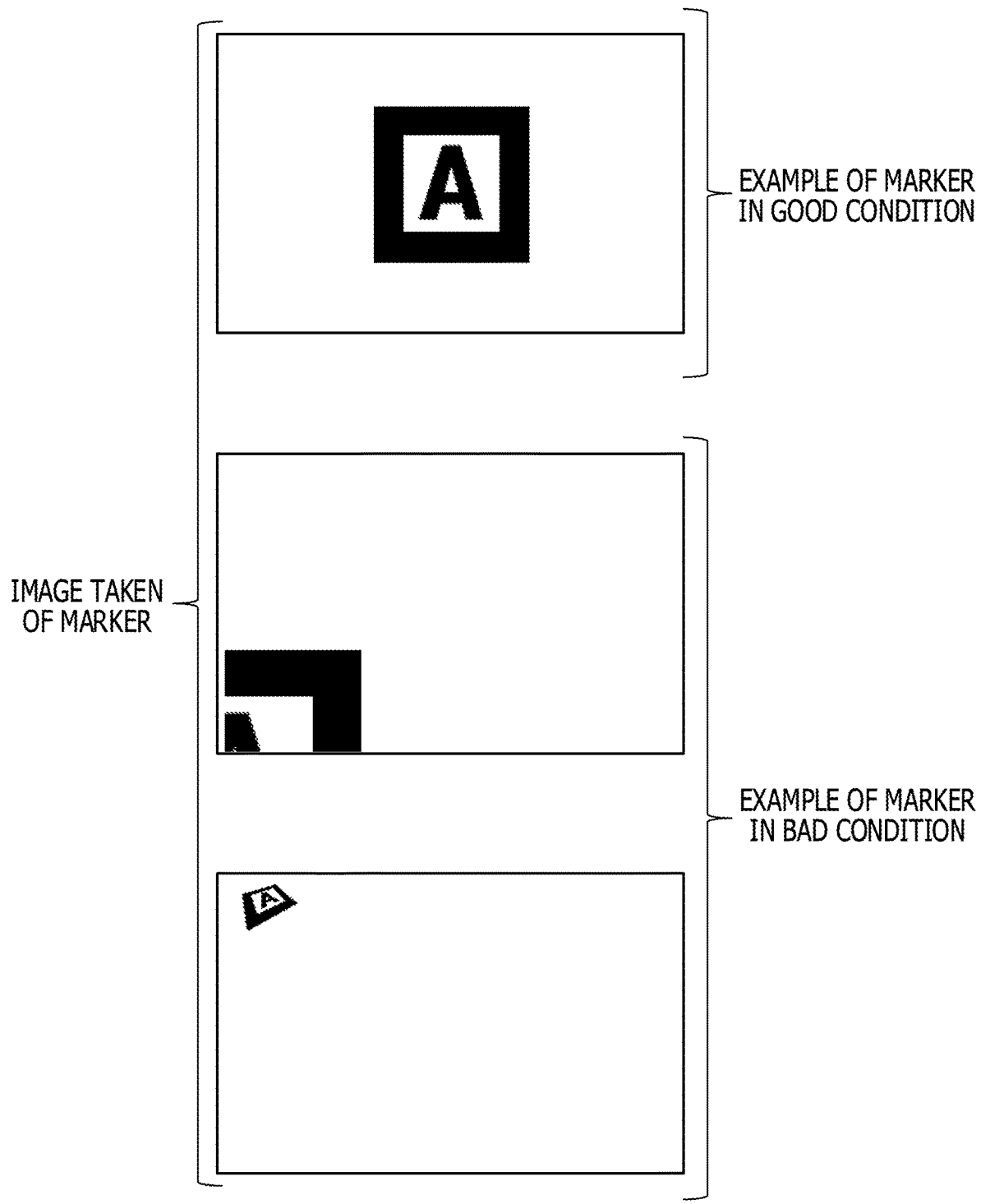
FIG. 15 is a diagram for explaining detection of a marker from an image.

Moreover, in the case of detecting the position of the target by using a marker, the position of the target may be accurately detected when the marker may be seen in a good condition within an image as illustrated in the upper part of FIG. 15, for example. However, when only a part of the marker may be seen as illustrated in the middle part of FIG. 15, or when the marker is distant from the camera and the size of the marker is too small within the image as illustrated in the lower part of FIG. 15, for example, the position of the target may not be accurately detected. In order to solve this problem, when a number of markers are arranged as in the conventional technology, it is desirable to perform calibration, management of arrangement, and the like for each of the markers. This increases processing load.

According to one aspect, it is an object to reduce a feeling of strangeness in display when a target that may be manipulated in a reality space is placed in a virtual space.

Hereinafter, with reference to the drawings, detailed description is given of an example of embodiments according to the disclosed technology.

<First Embodiment>

In a first embodiment, as an example, description is given of a case where an object that may be operated is a steering wheel in design evaluation of a driver seat of a vehicle.

Figure 1:
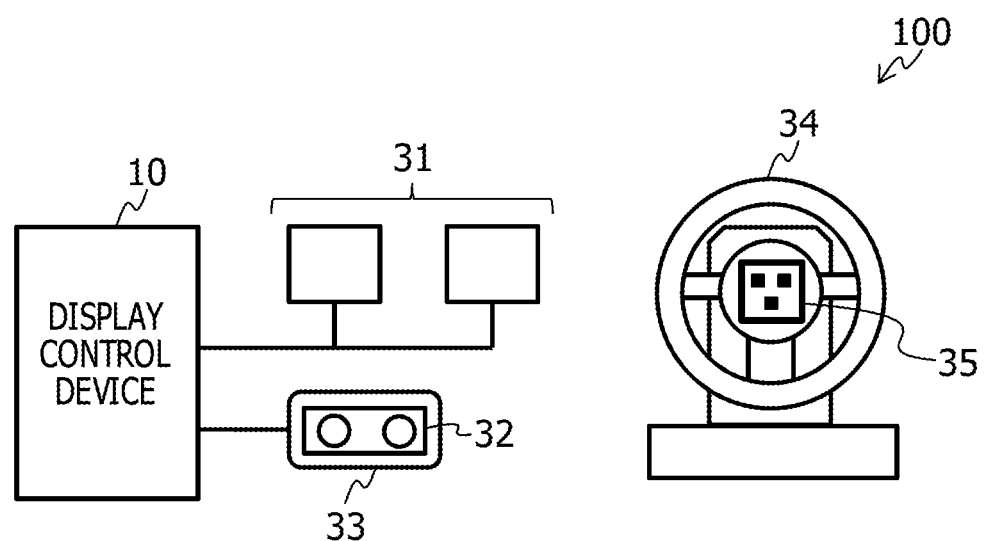
FIG. 1 is a schematic diagram illustrating a configuration of a VR system according to a first embodiment.

As illustrated in FIG. 1, a virtual reality (VR) system 100 according to the first embodiment includes a display control device 10, a VR tracking device 31, a stereo camera 32, and a head mounted display (HMD) 33. The VR system 100 further includes a steering wheel model 34 and an augmented reality (AR) marker 35.

The VR tracking device 31 may be realized by one or more laser radars, for example. Each laser radar irradiates lasers, receives lasers reflected by a light receiver of the HMD 33, and measures tracking data including information on the irradiation direction of the lasers and a distance to the light receiver of the HMD 33. The VR tracking device 31 outputs the measured tracking data to the display control device 10. Note that the VR tracking device 31 is an example of a first detection device of the disclosed technology.

The stereo camera 32 is attached to the HMD 33, and takes images of a range assumed to be a field of view of a wearer 40 wearing the HMD 33 with visible light cameras for right and left eyes. The stereo camera 32 outputs the images thus taken for the right and left eyes to the display control device 10. Note that the stereo camera 32 is an example of a second detection device and an image taking device of the disclosed technology.

The HMD 33 acquires VR images for the right and left eyes output from the display control device 10, and displays stereoscopic images on the display. Note that the VR images in this embodiment are images indicating a virtual space in which virtual three-dimensional objects representing a driver seat including a steering wheel are arranged. Note that the HMD 33 is an example of a display device of the disclosed technology.

The steering wheel model 34 is a full-sized steering wheel model capable of simulating a steering wheel operation.

The AR marker 35 is a pre-registered graphic marker, which is attached at a predetermined position on the steering wheel model 34. Note that the AR marker 35 is an example of a marker of the disclosed technology.

Figure 2:
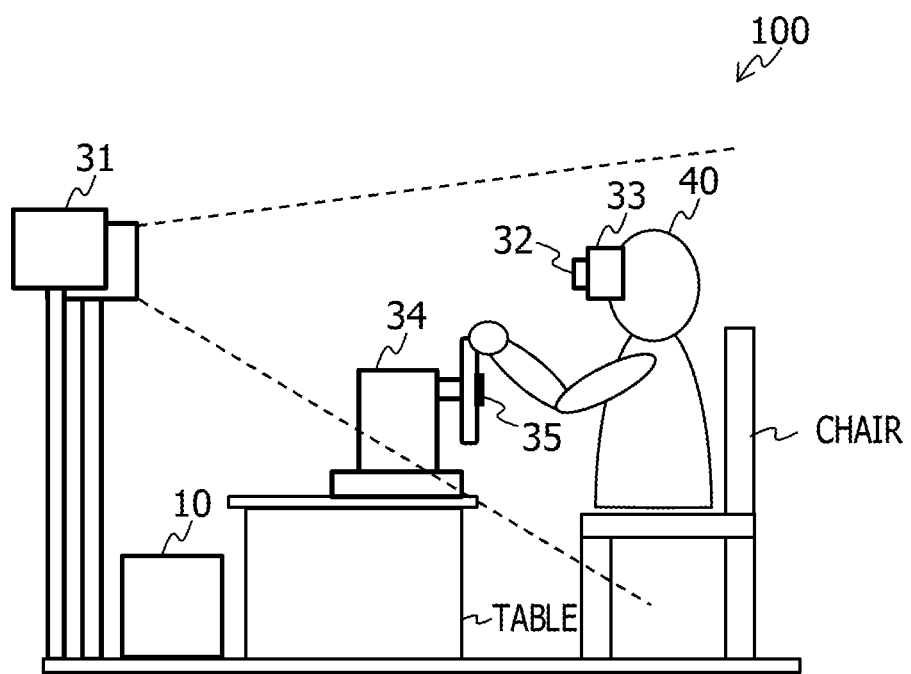
FIG. 2 is a schematic diagram illustrating an example of arrangement of respective components in the VR system according to the first embodiment.

FIG. 2 schematically illustrates an example of arrangement of the respective components in the VR system 100. The HMD 33 with the stereo camera 32 is attached to the head of the wearer 40. Assuming that a chair in which the wearer 40 is seated is the driver seat, the steering wheel model 34 is disposed at a position corresponding to a positional relationship between the seat and the steering wheel in the driver seat. FIG. 2 illustrates an example where the steering wheel model 34 is disposed on a table having a predetermined height, which is disposed at a position distant from the chair by a predetermined distance. The VR tracking device 31 is placed at a position where the HMD 33 worn by the wearer 40 is included in the measurement range of each laser radar, for example, placed diagonally to the wearer 40 seated in the chair.

Figure 3:
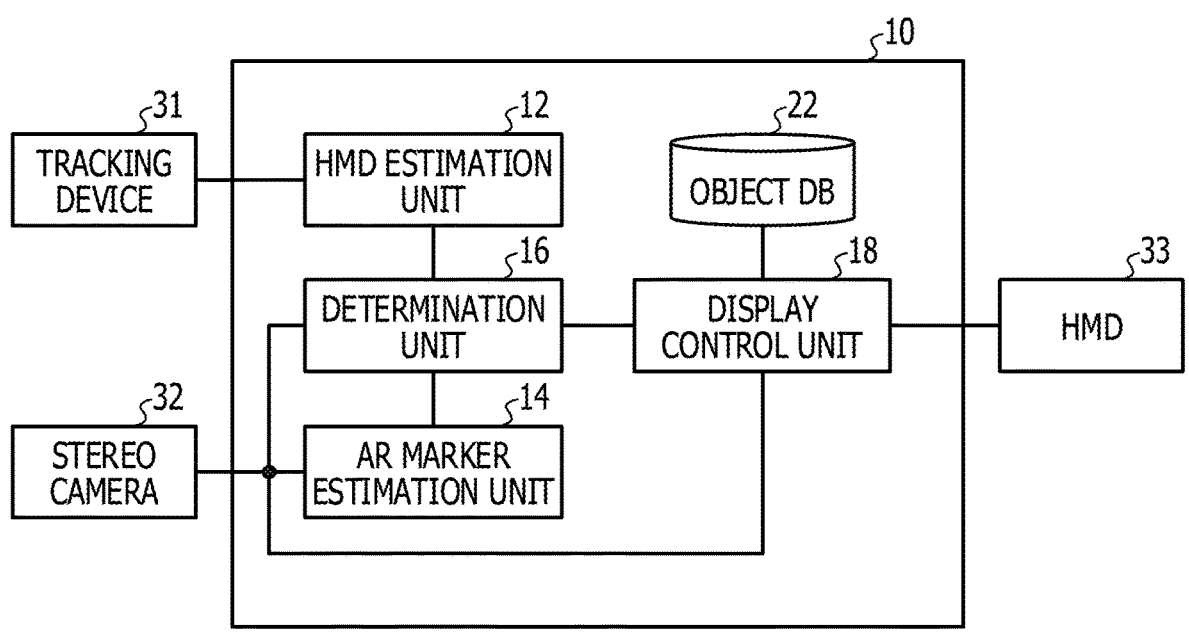
FIG. 3 is a functional block diagram of a display control device according to the first embodiment.

As illustrated in FIG. 3, the display control device 10 functionally includes an HMD estimation unit 12, an AR marker estimation unit 14, a determination unit 16, and a display control unit 18. The HMD estimation unit 12 is an example of a first estimation unit of the disclosed technology, and the AR marker estimation unit 14 is an example of a second estimation unit of the disclosed technology. Also, an object database (DB) 22 storing three-dimensional data on virtual objects indicating the driver seat (without the steering wheel) and the steering wheel arranged in the virtual space is stored in a predetermined storage area of the display control device 10.

The HMD estimation unit 12 acquires the tracking data output from the VR tracking device 31, and estimates the position and arrangement (angle relative to each coordinate axis) of the HMD 33 in a world coordinate system (virtual space coordinate system) based on the tracking data.

The AR marker estimation unit 14 acquires the respective images for the right and left eyes output from the stereo camera 32, and detects the AR marker 35 that is the pre-registered graphic by image recognition processing such as pattern matching from each of the images for the right and left eyes. The AR marker estimation unit 14 estimates the position and arrangement of the AR marker 35 in a camera coordinate system, based on the AR marker 35 detected from each of the images for the right and left eyes and a binocular parallax of the stereo camera 32. Since the position of the steering wheel model 34 with the AR marker 35 attached thereto is already known, the estimated position and arrangement of the AR marker 35 correspond to the position and arrangement of the steering wheel model 34.

Moreover, the AR marker estimation unit 14 determines reference arrangement by calibrating the arrangement of the objects indicating the driver seat including the steering wheel in the virtual space, as initialization processing.

To be more specific, the AR marker estimation unit 14 converts the position and arrangement of the AR marker 35 in the camera coordinate system estimated in the same manner as the above into those in the world coordinate system. The AR marker estimation unit 14 estimates the position and arrangement of the object indicating the driver seat when the driver seat is placed in the virtual space, based on the estimated position and arrangement of the AR marker 35 in the world coordinate system. Then, the AR marker estimation unit 14 stores the estimated position and arrangement of the object indicating the driver seat, as the reference arrangement, in association with the position and arrangement of the HMD 33 estimated by the HMD estimation unit 12.

Note that the position and arrangement of the AR marker 35 in the world coordinate system are preferably estimated with higher accuracy during the calibration. Therefore, the AR marker estimation unit 14 may acquire a distance between the steering wheel model 34 and the chair in which the wearer 40 is seated, and use this distance information to estimate the position and arrangement of the AR marker 35. For example, the AR marker estimation unit 14 may acquire such distance information through input from the wearer 40 or from values detected by distance sensors provided on the chair and at least one of the steering wheel model 34 and the table on which the steering wheel model 34 is placed. Moreover, the position of at least one of the steering wheel model 34 and the chair may be adjusted such that the distance between the steering wheel model 34 and the chair is set to a predetermined distance.

The determination unit 16 specifies a positional relationship between a predetermined part (for example, hand) of the wearer 40 wearing the HMD 33 and the steering wheel model 34. The determination unit 16 determines a method for determining the arrangement of the object indicating the steering wheel during VR image drawing, based on the specified positional relationship. As the method for determining the arrangement, there are two methods, including a method using the estimation result obtained by the HMD estimation unit 12 and a method using the estimation result obtained by the AR marker estimation unit 14.

The method using the estimation result obtained by the HMD estimation unit 12 is a method wherein the calibrated reference arrangement is determined as the arrangement of the object indicating the steering wheel. In this case, a predetermined range corresponding to an eye direction of the wearer 40 in the virtual space in which the object indicating the steering wheel is placed at a reference position is drawn as a VR image. The eye direction of the wearer 40 corresponds to the position and arrangement of the HMD 33 estimated by the HMD estimation unit 12. Therefore, in this embodiment, this method is referred to as the method using the estimation result obtained by the HMD estimation unit 12.

The method using the estimation result obtained by the AR marker estimation unit 14 is a method wherein the calibrated reference arrangement is determined as the arrangement indicated by the position and arrangement of the steering wheel model 34 in the camera coordinate system estimated by the AR marker estimation unit 14.

To be more specific, when the distance between the predetermined part of the wearer 40 and the steering wheel model 34 is a predetermined threshold or less, the determination unit 16 uses the method using the estimation result obtained by the AR marker estimation unit 14 to determine the arrangement of the object indicating the steering wheel. On the other hand, when the distance between the predetermined part of the wearer 40 and the steering wheel model 34 exceeds the predetermined distance, the calibrated reference arrangement is determined as the arrangement of the object indicating the steering wheel by the determination unit 16.

This means that, when the wearer 40 is trying to manipulate or manipulating the steering wheel model 34, the method with higher tracking accuracy for the head movement of the wearer 40 is adopted. Higher tracking accuracy for the head movement of the wearer 40 is achieved by directly estimating the position and arrangement of the steering wheel model 34 with the AR marker 35 detected from the image taken by the stereo camera 32 attached to the HMD 33, rather than using the estimation result obtained by the HMD estimation unit 12. Thus, a positional difference is reduced between the steering wheel model 34 in the reality space and the object indicating the steering wheel in the virtual space.

The determination unit 16 calculates the distance between the predetermined part of the wearer 40 and the steering wheel model 34 as described below, for example. The determination unit 16 extracts an arm region indicating the arm of the wearer 40 by extracting a skin color region, for example, from each of the images for the right and left eyes output from the stereo camera 32, or the like. The determination unit 16 estimates a position of a tip (farthest point from the stereo camera 32) of the arm region, based on the arm region extracted from each of the images for the right and left eyes and the binocular parallax of the stereo camera 32. Then, the determination unit 16 calculates a distance between the position of the AR marker 35 estimated by the AR marker estimation unit 14 and the estimated position of the tip of the arm region.

The display control unit 18 generates each of the VR images for the right and left eyes to be displayed on the HMD 33. A method for generating each VR image is described below. The display control unit 18 prepares a drawing region corresponding to the size of a VR image to be displayed on the HMD 33. In the drawing region, the display control unit 18 draws an image acquired from the stereo camera 32 as a background image.

Moreover, when the method using the estimation result obtained by the HMD estimation unit 12 is used to determine the arrangement of the object indicating the steering wheel, the display control unit 18 reads three-dimensional data on the object indicating the driver seat including the steering wheel from the object DB 22. Then, the display control unit 18 places the object indicating the driver seat including the steering wheel at the calibrated reference position. Thereafter, the display control unit 18 draws the object, when the virtual space is seen from the eye direction of the wearer 40 corresponding to the position and arrangement of the HMD 33 estimated by the HMD estimation unit 12, so as to overlap with the drawing region in which the background image is drawn.

On the other hand, when the method using the estimation result obtained by the AR marker estimation unit 14 is used to determine the arrangement of the object indicating the steering wheel, the display control unit 18 reads three-dimensional data on the object indicating the driver seat without the steering wheel from the object DB 22. Then, as in the case of the object indicating the driver seat including the steering wheel described above, the display control unit 18 draws the object indicating the driver seat without the steering wheel in the drawing region. Furthermore, the display control unit 18 reads the three-dimensional data on the object indicating the steering wheel from the object DB 22. The display control unit 18 draws the object indicating the steering wheel corresponding to the position and arrangement of the steering wheel model 34 in the camera coordinate system estimated by the AR marker estimation unit 14, such that the object overlaps with the drawing region in which the background image and the object of the driver seat without the steering wheel are drawn.

Moreover, the display control unit 18 draws an image of the arm region extracted from the image by the determination unit 16, such that the image overlaps with the drawings region in which the background image and the object of the driver seat including the steering wheel are drawn.

Figure 4:
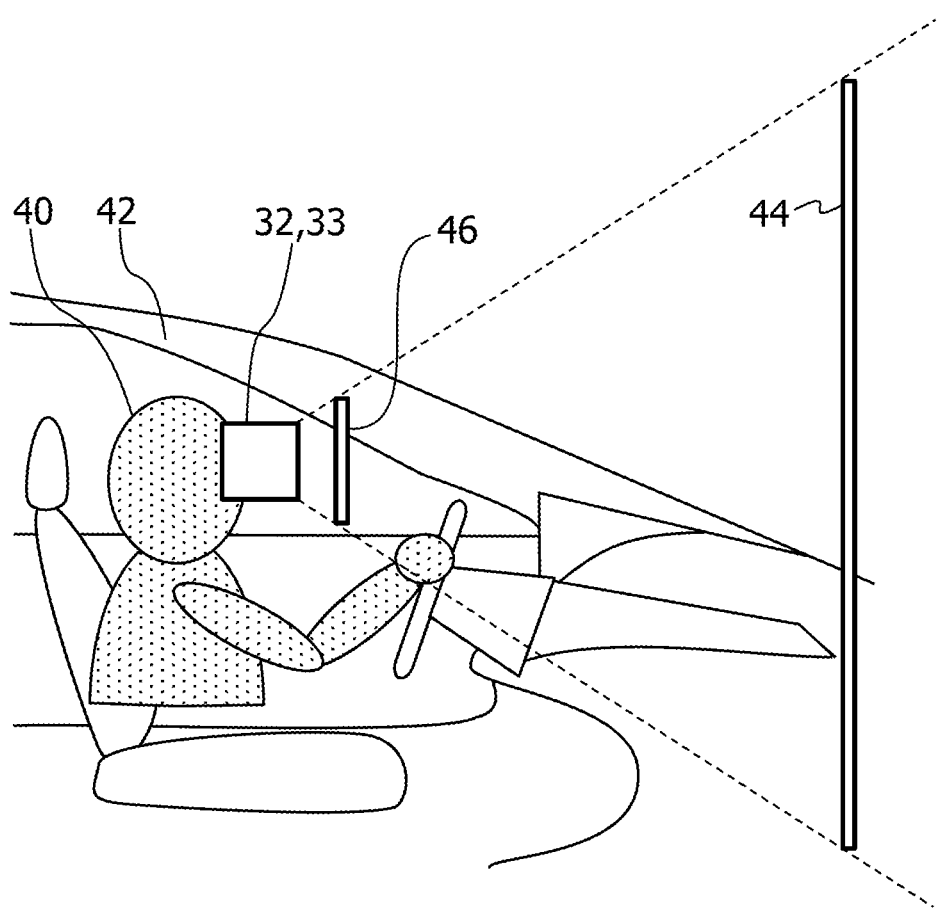
FIG. 4 is a conceptual diagram illustrating a state of drawing in correspondence with a virtual space.

FIG. 4 conceptually illustrates the state of the drawing described above in correspondence with the virtual space. In the virtual space, an object 42 of the driver seat is drawn around the wearer 40 (HMD 33). Then, the background image is drawn on a screen 44 positioned behind the object 42 of the driver seat as seen from the wearer 40, and the image of the arm region is drawn on a screen 46 positioned inside the object 42 of the driver seat.

The display control unit 18 performs the above drawing for the right and left eyes, respectively, thereby generating VR images for the right and left eyes, respectively. The display control unit 18 outputs the generated VR images for the right and left eyes to the HMD 33.

Figure 5:
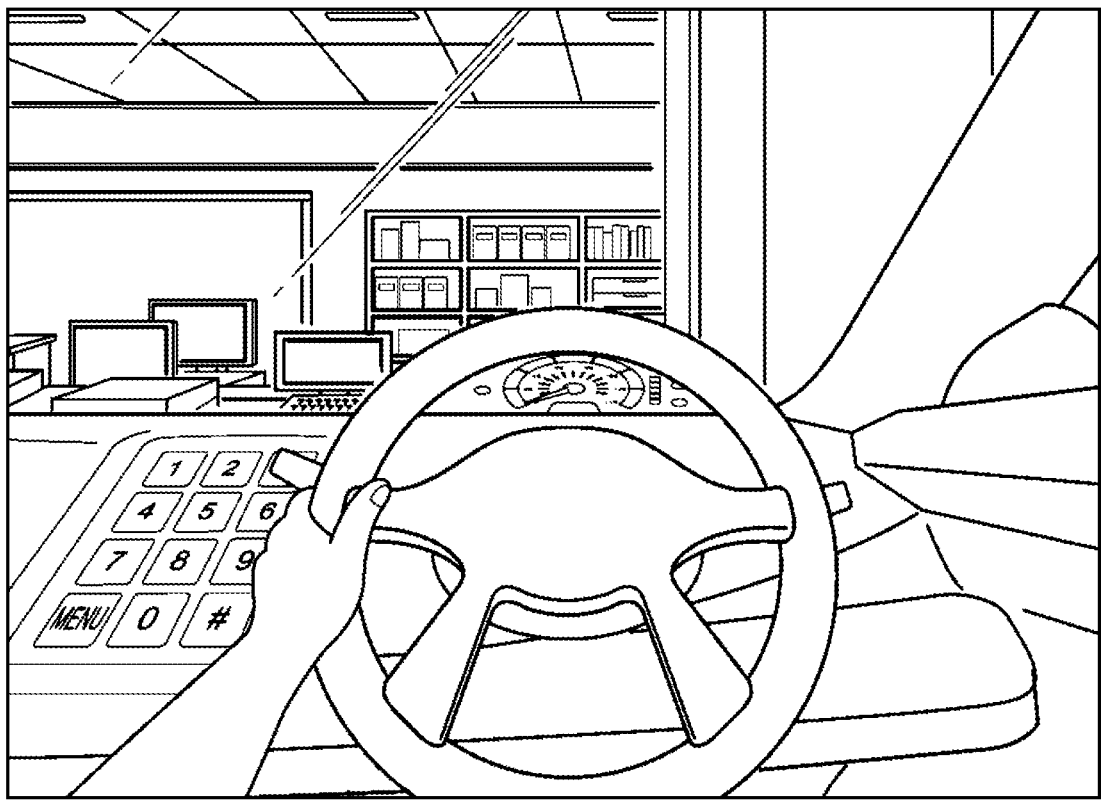
FIG. 5 is a diagram illustrating an example of a VR image in the first embodiment.

Thus, a VR image as illustrated in FIG. 5, for example, is displayed on the HMD 33. In the example of FIG. 5, images seen through a front window and a side window are those illustrating the reality space taken with the stereo camera 32, and the driver seat including the steering wheel is a virtual three-dimensional object.

Figure 6:
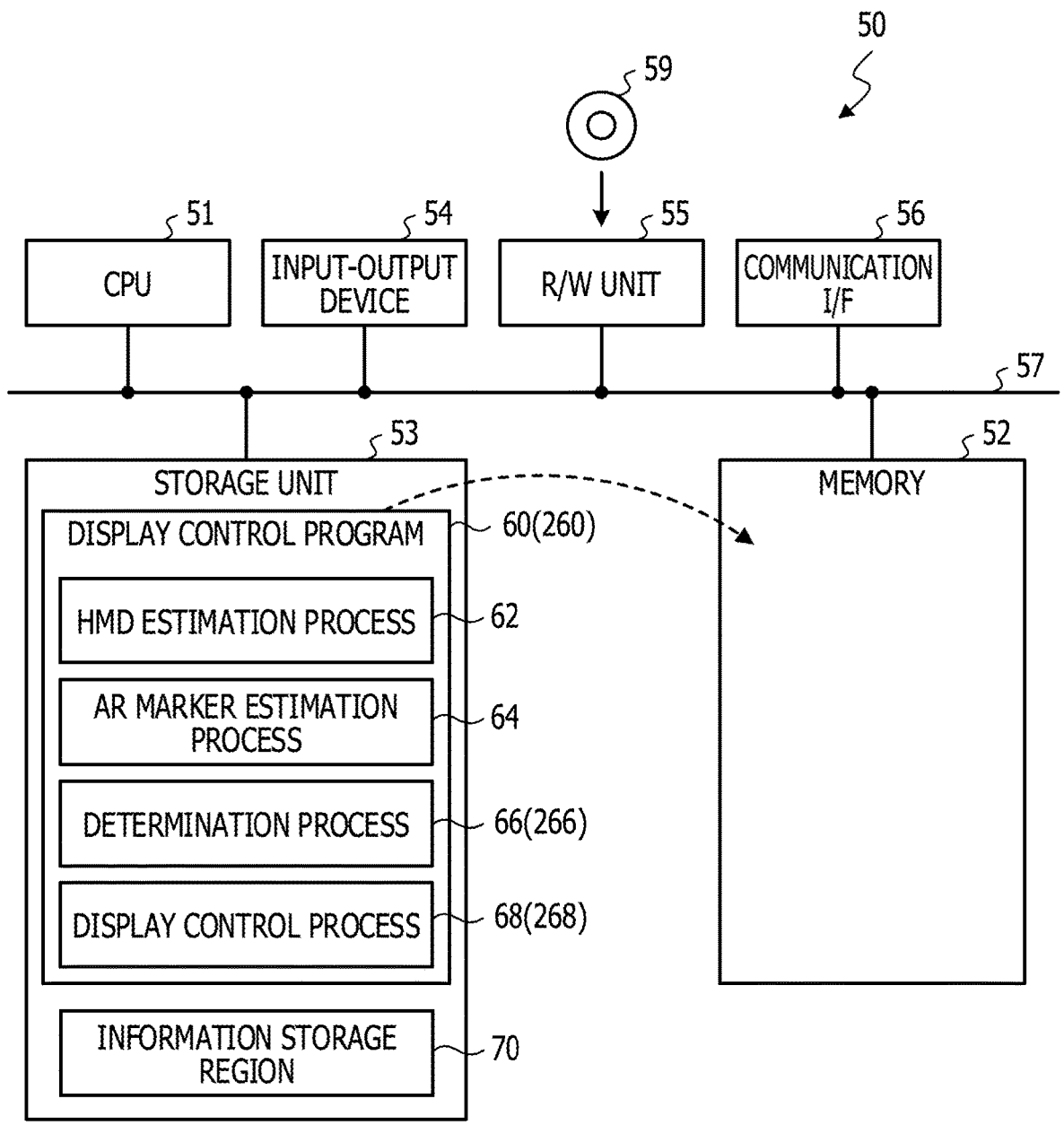
FIG. 6 is a block diagram illustrating a schematic configuration of a computer that functions as a display device according to the first embodiment and a second embodiment.

The display control device 10 may be realized by a computer 50 illustrated in FIG. 6, for example. The computer 50 includes a central processing unit (CPU) 51, a memory 52 as a temporary storage area, and a non-volatile storage unit 53. The computer 50 also includes an input-output device 54 such as an input device and a display device, a read/write (R/W) unit 55 that controls reading and writing data from and into a storage medium 59, and a communication interface (I/F) 56 connected to a network such as the Internet. The CPU 51, the memory 52, the storage unit 53, the input-output device 54, the R/W unit 55, and the communication I/F 56 are connected to each other via a bus 57.

The storage unit 53 may be realized by a hard disk drive (HDD), a solid state drive (SSD), a flash memory or the like. The storage unit 53 as a storage medium stores a display control program 60 for causing the computer 50 to function as the display control device 10. The display control program 60 includes an HMD estimation process 62, an AR marker estimation process 64, a determination process 66, and a display control process 68. The storage unit 53 also includes an information storage region 70 that stores information included in the object DB 22.

The CPU 51 reads the display control program 60 from the storage unit 53, develops the program into the memory 52, and sequentially executes the processes included in the display control program 60. The CPU 51 operates as the HMD estimation unit 12 illustrated in FIG. 3 by executing the HMD estimation process 62. Also, the CPU 51 operates as the AR marker estimation unit 14 illustrated in FIG. 3 by executing the AR marker estimation process 64. In addition, the CPU 51 operates as the determination unit 16 illustrated in FIG. 3 by executing the determination process 66. Moreover, the CPU 51 operates as the display control unit 18 illustrated in FIG. 3 by executing the display control process 68. Furthermore, the CPU 51 reads information from the information storage region 70 and develops the object DB 22 into the memory 52. Thus, the computer 50 that has executed the display control program 60 functions as the display control device 10. Note that the CPU 51 executing the program is hardware.

Note that the functions realized by the display control program 60 may also be realized by a semiconductor integrated circuit, for example, to be more specific, an application specific integrated circuit (ASIC) and the like.

Next, description is given of operations of the display control device 10 according to the first embodiment. When the VR system 100 is activated, the VR tracking device 31 starts VR tracking and outputs tracking data. At the same time, the stereo camera 32 starts taking images and outputs images for the right and left eyes. Then, the display control device 10 executes display control processing illustrated in FIG. 8 after executing initialization processing illustrated in FIG. 7. Note that the display control processing is an example of a display control method of the disclosed technology.

Figure 7:
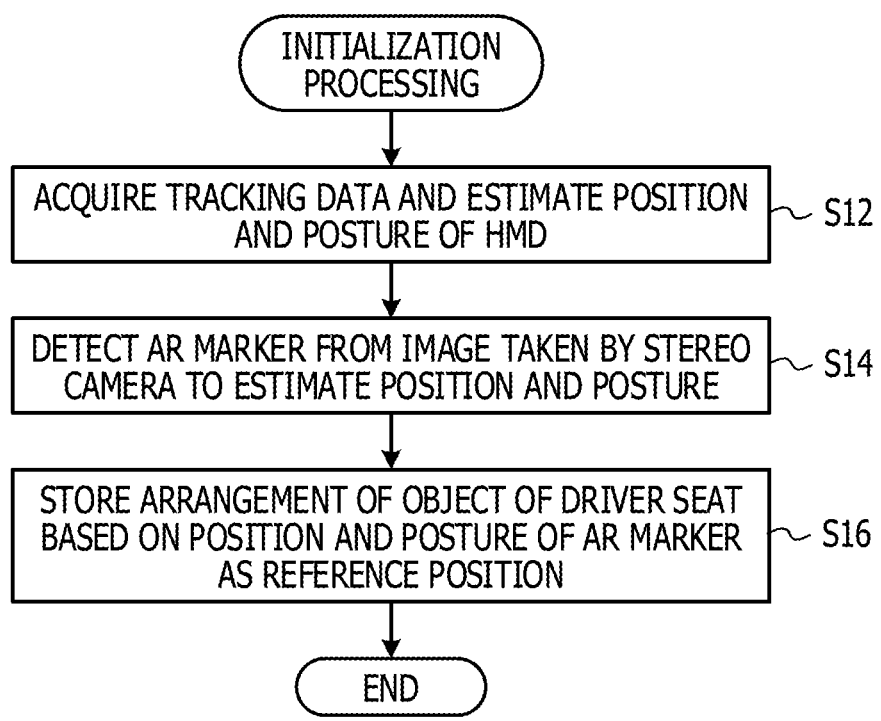
FIG. 7 is a flowchart illustrating an example of initialization processing.

First, description is given of the initialization processing illustrated in FIG. 7.

In Step S12, the HMD estimation unit 12 acquires the tracking data output from the VR tracking device 31 and estimates the position and arrangement of the HMD 33 in the world coordinate system (virtual space coordinate system) based on the tracking data.

Next, in Step S14, the AR marker estimation unit 14 acquires the images for the right and left eyes output from the stereo camera 32. In this event, a message encouraging the wearer 40 to adjust his/her head direction may be displayed on the HMD 33 so that the AR marker 35 may be seen in a good condition as illustrated in the upper part of FIG. 15, for example. Then, the AR marker estimation unit 14 detects the AR marker 35 from each of the images for the right and left eyes, and estimates the position and arrangement of the AR marker 35 based on the binocular parallax of the stereo camera 32.

Thereafter, in Step S16, the AR marker estimation unit 14 converts the estimated position and arrangement of the AR marker 35 in the camera coordinate system into those in the world coordinate system. Then, the AR marker estimation unit 14 estimates the position and arrangement of the object indicating the driver seat when the driver seat is placed in the virtual space, based on the estimated position and arrangement of the AR marker 35 in the world coordinate system. Furthermore, the AR marker estimation unit 14 stores the estimated position and arrangement of the object indicating the driver seat as the reference arrangement, in association with the position and arrangement of the HMD 33 estimated by the HMD estimation unit 12. Thus, the arrangement of the object of the driver seat is calibrated, and then the initialization processing is terminated.

Figure 8:
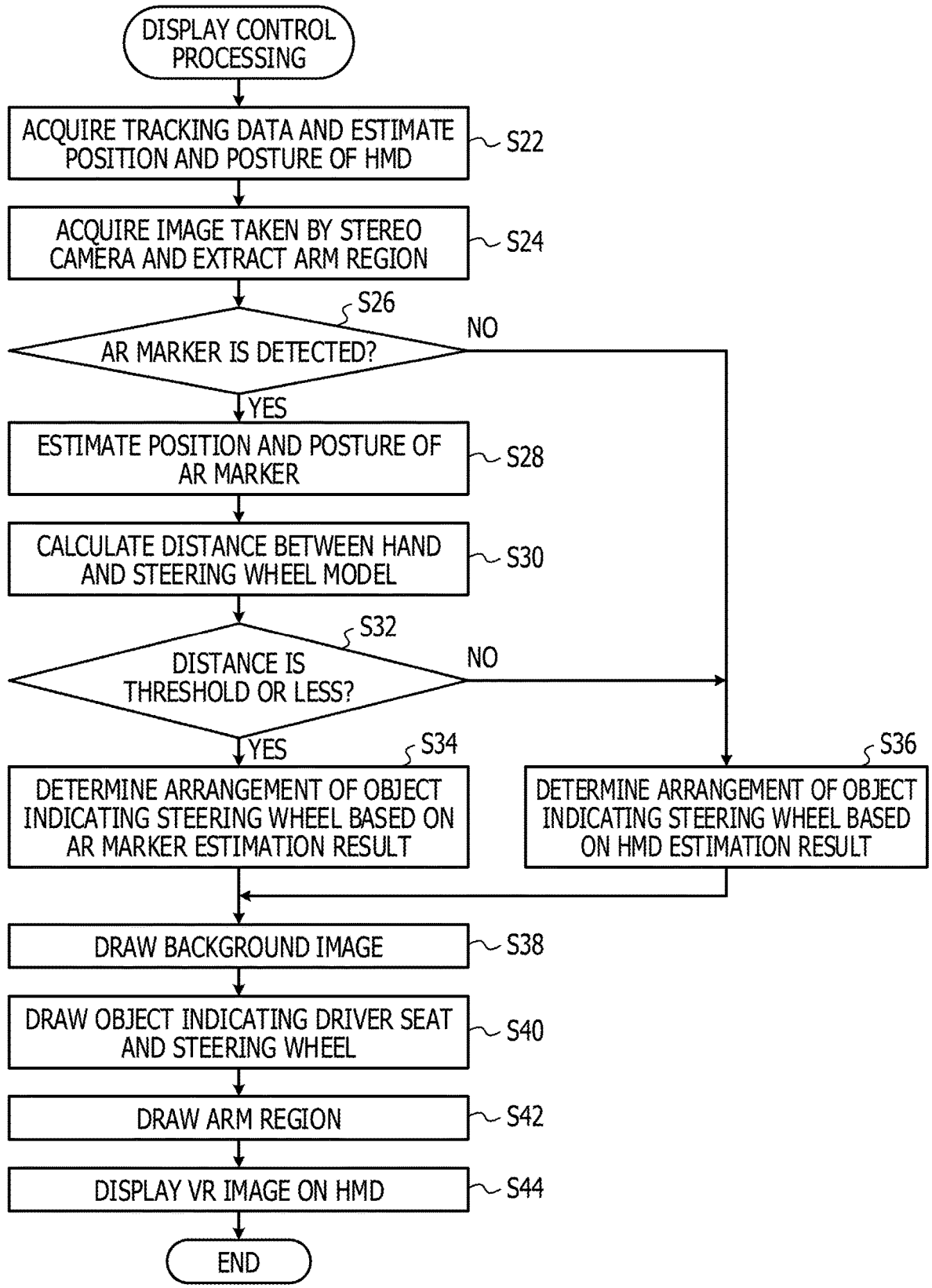
FIG. 8 is a flowchart illustrating an example of display control processing in the first embodiment.

Next, description is given of the display control processing illustrated in FIG. 8.

In Step S22, the HMD estimation unit 12 acquires the tracking data output from the VR tracking device 31 and estimates the position and arrangement of the HMD 33 in the world coordinate system (virtual space coordinate system) based on the tracking data.

Next, in Step S24, the AR marker estimation unit 14 and the determination unit 16 acquire the images for the right and left eyes output from the stereo camera 32, respectively. Then, the determination unit 16 extracts an arm region indicating the arm of the wearer 40 by extracting a skin color region, for example, from each of the images for the right and left eyes output from the stereo camera 32, or the like.

Then, in Step S26, the AR marker estimation unit 14 performs image recognition processing such as pattern matching to determine whether or not the AR marker 35 that is a pre-registered graphic is detected from each of the acquired images for the right and left eyes. The processing moves to Step S28 if the AR marker 35 is detected, and moves to Step S36 if not.

In Step S28, the AR marker estimation unit 14 estimates the position and arrangement of the AR marker 35 in the camera coordinate system based on the AR marker 35 detected from each of the images for the right and left eyes and the binocular parallax of the stereo camera 32.

Next, in Step S30, the determination unit 16 estimates the position of the tip of the arm region based on the arm region extracted from each of the images for the right and left eyes in Step S24 and the binocular parallax of the stereo camera 32. Then, the determination unit 16 calculates a distance between the position of the AR marker 35 estimated in Step S28, that is, the position of the steering wheel model 34 and the estimated position of the tip of the arm region.

Thereafter, in Step S32, the determination unit 16 determines whether or not the distance calculated in Step S30 is a predetermined threshold or less. When the distance is the threshold or less, the determination unit 16 determines that the wearer 40 is trying to manipulate or manipulating the steering wheel model 34, and the processing moves to Step S34. On the other hand, when the distance exceeds the threshold, the processing moves to Step S36.

In Step S34, the determination unit 16 uses the method using the estimation result obtained by the AR marker estimation unit 14 to determine the arrangement of the object indicating the steering wheel. On the other hand, in Step S36, the determination unit 16 uses the method using the estimation result obtained by the HMD estimation unit 12 to determine the arrangement of the object indicating the steering wheel.

Then, in Step S38, the display control unit 18 prepares a drawing region corresponding to the size of a VR image to be displayed on the HMD 33. The display control unit 18 draws the image acquired from the stereo camera 32 as a background image in the drawing region.

Thereafter, in Step S40, the display control unit 18 draws the object of the driver seat and the steering wheel such that the object overlaps with the drawing region. In this event, when the method using the estimation result obtained by the HMD estimation unit 12 is used to determine the arrangement of the object indicating the steering wheel, the display control unit 18 reads three-dimensional data of the object indicating the driver seat including the steering wheel from the object DB 22. Then, the display control unit 18 places the object indicating the driver seat including the steering wheel at a calibrated reference position in the virtual space. Thereafter, the display control unit 18 draws the object in the eye direction of the wearer 40 corresponding to the position and arrangement of the HMD 33 estimated by the HMD estimation unit 12, such that the object overlaps with the drawing region in which the background image is drawn.

On the other hand, when the method using the estimation result obtained by the AR marker estimation unit 14 is used to determine the arrangement of the object indicating the steering wheel, the display control unit 18 reads three-dimensional data of the object indicating the driver seat without the steering wheel from the object DB 22. Then, as in the case of the object indicating the driver seat including the steering wheel, the display control unit 18 draws the object in the drawing region. Furthermore, the display control unit 18 reads three-dimensional data of the object indicating the steering wheel from the object DB 22. Thereafter, the display control unit 18 draws the object indicating the steering wheel corresponding to the position and arrangement of the steering wheel model 34 in the camera coordinate system estimated by the AR marker estimation unit 14, such that the object overlaps with the drawing region in which the background image and the object of the driver seat without the steering wheel are drawn.

Note that, in the case of the method using the estimation result obtained by the HMD estimation unit 12, again, a rotation angle of the steering wheel may be determined based on the position and arrangement of the steering wheel model 34 estimated using the AR marker 35.

Next, in Step S42, the display control unit 18 draws the image of the arm region extracted from the respective images for the right and left eyes by the determination unit 16 in Step S24, such that the image overlaps with the drawing region in which the background image and the object of the driver seat including the steering wheel are drawn.

The display control unit 18 generates VR images for the right and left eyes by performing the processing of Steps S38 to S42 for the right and left eyes, respectively.

Next, in Step S44, the display control unit 18 outputs the generated VR images for the right and left eyes to the HMD 33. Thus, the VR image as illustrated in FIG. 5, for example, is displayed on the HMD 33. Then, the display control processing is terminated.

The display control unit 18 repeatedly executes the above display control processing at predetermined time intervals (for example, the same intervals as a frame rate of the stereo camera) until termination of the VR system 100 is instructed.

As described above, according to the VR system 100 of the first embodiment, the display control device 10 switches the method for determining the drawing position of the target in the VR image, depending on whether or not the wearer is trying to manipulate or manipulating the target. To be more specific, when the wearer is trying to manipulate or manipulating the target, the display control device 10 uses the estimation result of the position and arrangement of the target obtained using the AR marker with higher tracking accuracy for the head movement of the wearer. On the other hand, when the wearer is not trying to manipulate and not operating the target, the display control device 10 uses the estimation result of the position and arrangement of the HMD by VR tracking with lower tracking accuracy for the head movement of the wearer compared with the case of using the AR marker. Thus, a feeling of strangeness in display may be reduced when the target that may be manipulated in the reality space is placed in the virtual space.

Moreover, when the wearer is trying to manipulate or manipulating the target by dynamically switching the method for determining the drawing position of the target as described above, a positional difference between a predetermined part (for example, a hand) of the wearer and the target may be reduced. On the other hand, when the wearer is not trying to manipulate or not manipulating the target, positional differences between the object indicating the target and other objects may be reduced. Thus, a feeling of strangeness in display may be reduced throughout the display of the VR image.

<Second Embodiment>

Next, a second embodiment is described. In the second embodiment, description is given of a case, as an example, where a target that may be operated is an operation screen in design evaluation of an ATM machine. Note that, in a VR system according to the second embodiment, the same components as those in the VR system 100 according to the first embodiment are denoted by the same reference numerals, and detailed description thereof is omitted.

Figure 9:
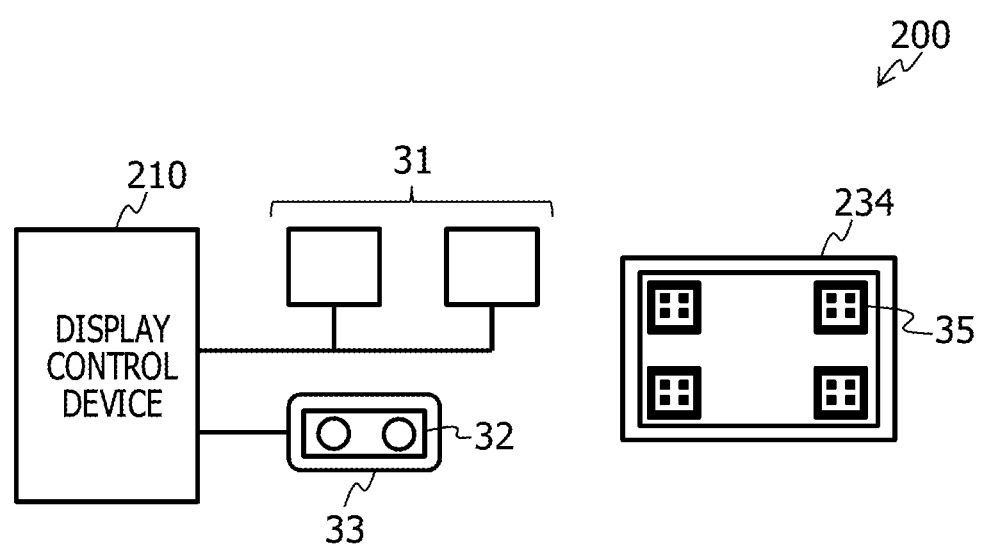
FIG. 9 is a schematic diagram illustrating a configuration of a VR system according to the second embodiment.

As illustrated in FIG. 9, a VR system 200 according to the second embodiment includes a display control device 210, a VR tracking device 31, an HMD 33 with a stereo camera 32 attached thereto, and a tablet terminal 234.

The tablet terminal 234 corresponds to an operation screen of an ATM machine in a virtual space, and is a touch panel display that may be operated by a wearer 40. On the tablet terminal 234, AR markers 35 are displayed at positions capable of specifying the size of the operation screen in the ATM machine. The tablet terminal 234 is provided with a touch sensor for detecting a touch on the screen and a proximity sensor for detecting the proximity of a finger or the like to the screen.

Figure 10:
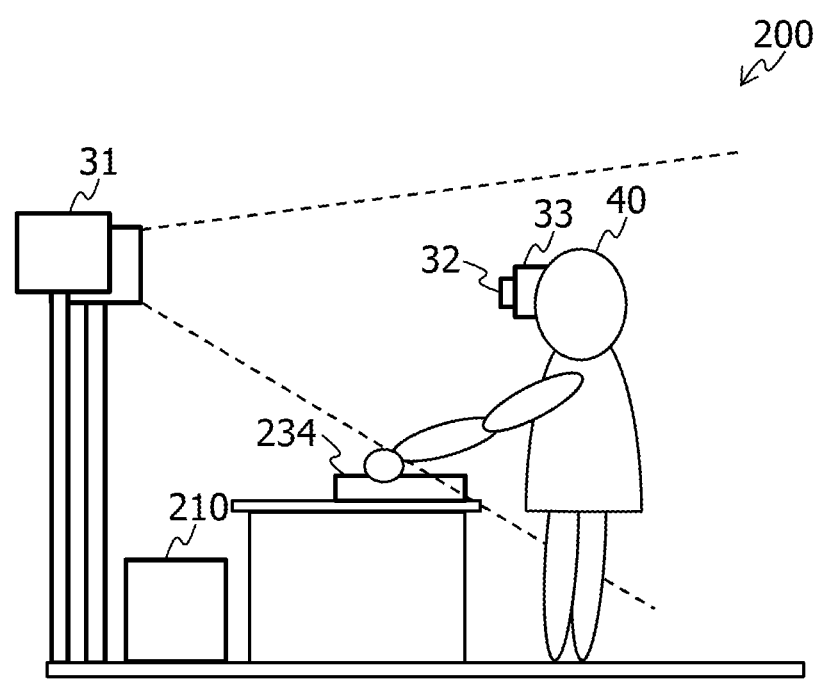
FIG. 10 is a schematic diagram illustrating an example of arrangement of respective components in the VR system according to the second embodiment.

FIG. 10 schematically illustrates an example of arrangement of the respective components in the VR system 200. As illustrated in FIG. 10, the arrangement of the respective components in the VR system 200 according to the second embodiment is different in that the tablet terminal 234 is placed instead of the steering wheel model 34 in the VR system 100 according to the first embodiment.

Figure 11:
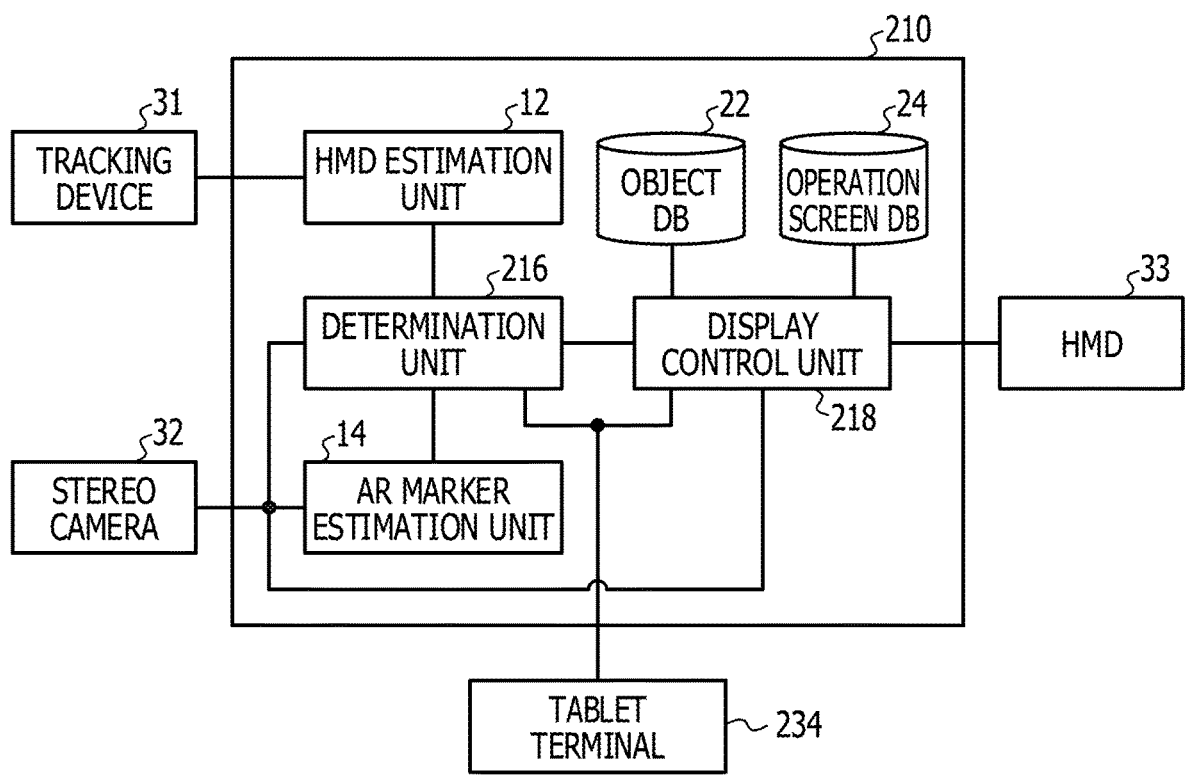
FIG. 11 is a functional block diagram of a display control device according to the second embodiment.

As illustrated in FIG. 11, the display control device 10 functionally includes an HMD estimation unit 12, an AR marker estimation unit 14, a determination unit 216, and a display control unit 218. Also, predetermined storage areas of the display control device 210 store an object DB 22 and an operation screen DB 24 storing screen data on operation screens for each display content and definition information on a transition relationship between the operation screens.

The determination unit 216 determines, based on a detection result obtained by the proximity sensor provided in the tablet terminal 234, whether or not a distance between a predetermined part of the wearer 40 and the tablet terminal 234 is a predetermined distance or less.

To be more specific, when it is detected by the proximity sensor that an object is in the proximity of the tablet terminal 234, the determination unit 216 uses a method using the estimation result obtained by the AR marker estimation unit 14 to determine the arrangement of the object indicating the operation screen. On the other hand, when no proximity is detected, the determination unit 216 uses a method using the estimation result obtained by the HMD estimation unit 12 to determine the arrangement of the object indicating the operation screen, that is, determines the calibrated reference arrangement as the arrangement of the object.

As in the case of the display control unit 18 in the first embodiment, the display control unit 218 generates a VR image obtained by drawing a background image, the object, and an arm region so as to sequentially overlap with each other. Furthermore, the display control unit 218 in the second embodiment draws an image indicating a display content on the drawn object indicating the operation screen. To be more specific, the display control unit 218 acquires screen data indicating an initial screen from the operation screen DB 24 and draws the screen data on the drawn object indicating the operation screen. Then, when a touch operation onto the tablet terminal 234 is detected by the touch sensor in the tablet terminal 234, the display control unit 218 acquires coordinate information of the touch on the display of the tablet terminal 234. Then, the display control unit 218 specifies screen data of a display content to be displayed next, based on the display content currently displayed as the operation screen and the definition information on the transition relationship between the operation screens stored in the operation screen DB 24, and acquires the specified screen data from the operation screen DB 24.

Figure 12:
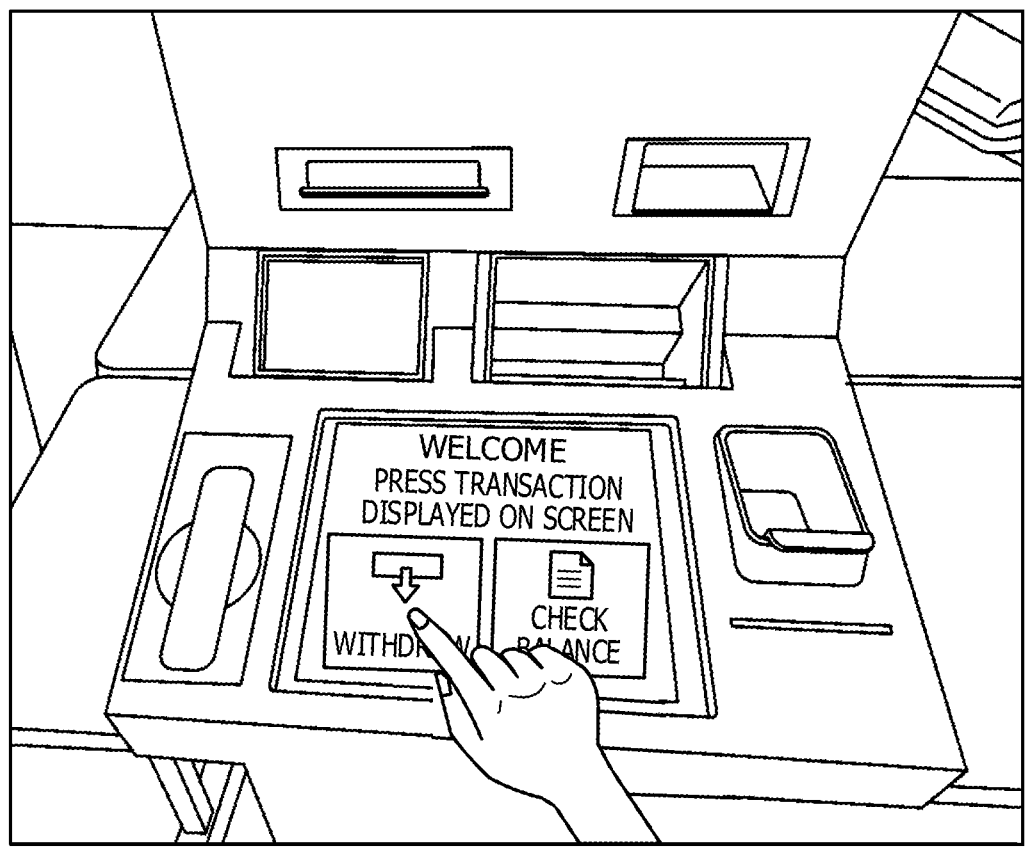
FIG. 12 is a diagram illustrating an example of a VR image in the second embodiment.

FIG. 12 illustrates an example of the VR image in the second embodiment. In the example of FIG. 12, images of the background of the ATM machine and of the arm are those illustrating the reality space taken by the stereo camera 32, and a part of the ATM machine except for the display content on the operation screen is a virtual three-dimensional object. Moreover, the display content on the operation screen is an insert image based on the screen data stored in the operation screen DB 24.

The display control device 210 may be realized by the computer 50 illustrated in FIG. 6, for example. The storage unit 53 in the computer 50 stores a display control program 260 for causing the computer 50 to function as the display control device 210. The display control program 260 includes an HMD estimation process 62, an AR marker estimation process 64, a determination process 266, and a display control process 268. The storage unit 53 also includes an information storage region 70 that stores information included in the object DB 22 and the operation screen DB 24.

The CPU 51 reads the display control program 260 from the storage unit 53, develops the program into the memory 52, and sequentially executes the processes included in the display control program 260. The CPU 51 operates as the determination unit 216 illustrated in FIG. 11 by executing the determination process 266. Also, the CPU 51 operates as the display control unit 218 illustrated in FIG. 11 by executing the display control process 268. Moreover, the CPU 51 reads information from the information storage region 70 and develops the object DB 22 and the operation screen DB 24 into the memory 52. The other processes are the same as those in the display control program 60 according to the first embodiment. Thus, the computer 50 that has executed the display control program 260 functions as the display control device 210.

Note that the functions realized by the display control program 260 may also be realized by a semiconductor integrated circuit, for example, to be more specific, an ASIC and the like.

Next, description is given of operations of the display control device 210 according to the second embodiment. When the VR system 200 is activated, the VR tracking device 31 starts VR tracking and outputs tracking data. At the same time, the stereo camera 32 starts taking images and outputs images for the right and left eyes. Then, the display control device 210 executes display control processing illustrated in FIG. 13 after executing the initialization processing illustrated in FIG. 7. Note that the display control processing is an example of the display control method of the disclosed technology.

The initialization processing illustrated in FIG. 7 is the same as that in the first embodiment, and thus description thereof is omitted. Note that "object indicating driver seat" in Step S16 is replaced by "object indicating operation screen".

Figure 13:
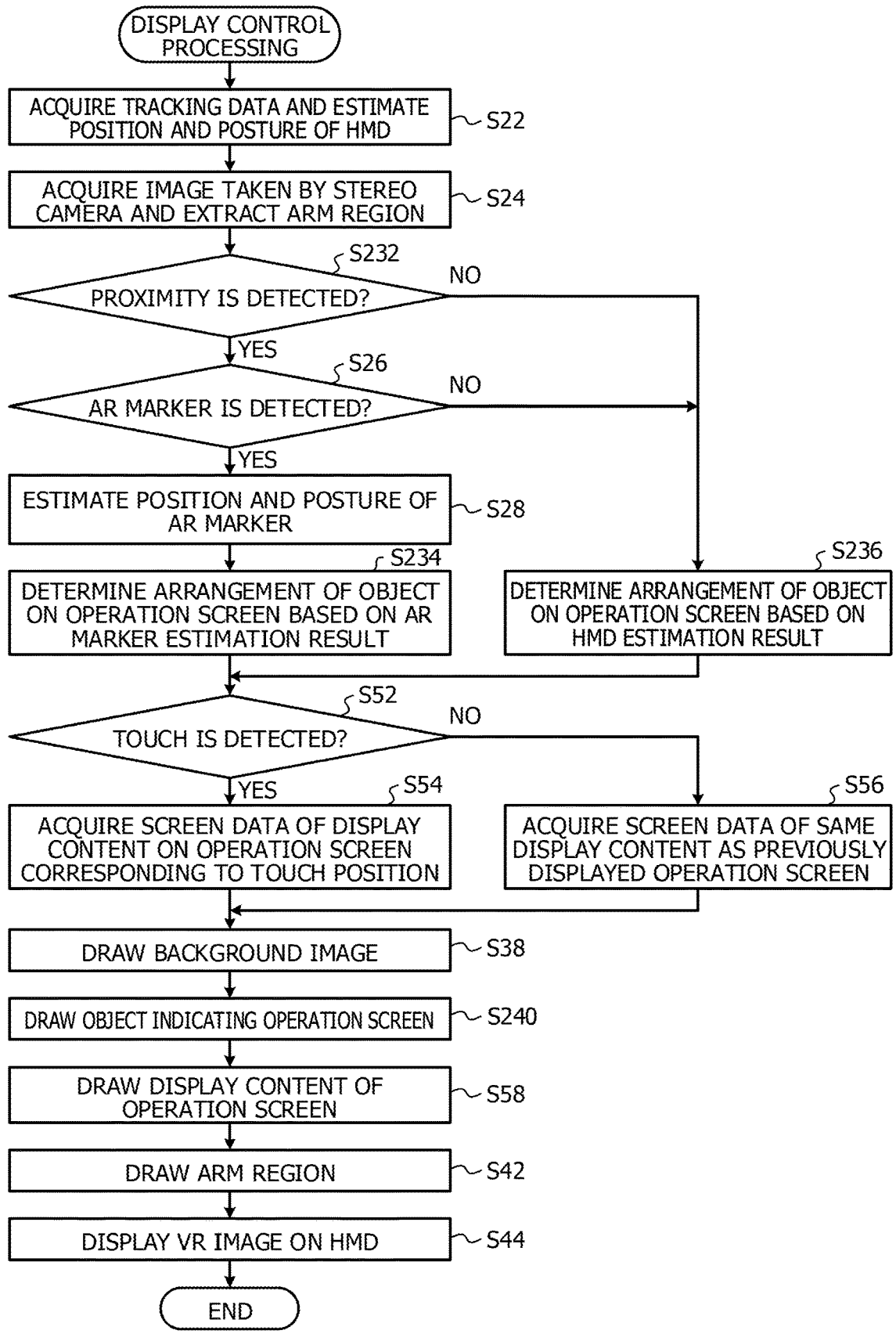
FIG. 13 is a flowchart illustrating an example of display control processing in the second embodiment.

Next, description is given of the display control processing illustrated in FIG. 13. Note that the same steps as those in the display control processing in the first embodiment are denoted by the same reference numerals, and detailed description thereof is omitted.

After Steps S22 and S24, the processing moves to Step S232 where the determination unit 216 determines whether or not the proximity of an object to the tablet terminal 234 is detected by the proximity sensor. The processing moves to Step S26 if the proximity is detected, and moves to Step S236 if not.

If Yes in Step S26 and the position and arrangement of the AR marker 35 are estimated in Step S28, the processing moves to Step S234 where the determination unit 216 uses the method using the estimation result obtained by the AR marker estimation unit 14 to determine the arrangement of the object indicating the operation screen. In Step S236, on the other hand, the determination unit 216 uses the method using the estimation result obtained by the HMD estimation unit 12 to determine the arrangement of the object indicating the operation screen.

Next, in Step S52, the display control unit 218 determines whether or not a touch operation on the tablet terminal 234 is detected by the touch sensor in the tablet terminal 234. The processing moves to Step S54 if the touch operation is detected, and moves to Step S56 if not.

In Step S54, the display control unit 218 acquires coordinate information of the touch on the display of the tablet terminal 234. Then, the display control unit 218 acquires screen data of a display content to be displayed next, based on the coordinate information of the touch, the display content currently displayed as the operation screen and the definition information on the transition relationship between the operation screens stored in the operation screen DB 24. On the other hand, in Step S56, the display control unit 218 acquires the same screen data as the previously displayed content.

Next, in Step S38, the display control unit 218 draws a background image in the drawing region.

Then, in Step S240, the display control unit 218 draws the object indicating the operation screen such that the object overlaps with the drawing region, according to the method for determining the arrangement of the object indicating the operation screen in Step S234 or S236 described above.

Thereafter, in Step S58, the display control unit 218 draws the display content of the operation screen indicated by the screen data acquired in Step S54 or S56 described above, on the object indicating the operation screen drawn in the drawing region.

Subsequently, Steps S42 and S44 are executed in the same manner as those in the first embodiment, and then the display control processing is terminated.

As described above, according to the VR system 200 of the second embodiment, the display control device 210 switches the method for determining the drawing position of the target in the VR image, depending on whether or not the wearer is trying to manipulate or manipulating the target, as in the case of the first embodiment. Thus, a feeling of strangeness in display may be reduced when the target that may be manipulated in the reality space is placed in the virtual space.

Moreover, since the display control device 210 places the object indicating the target, based on the position and arrangement of the target estimated by the AR marker detected, the position of the object indicating the target in the virtual space is also changed by changing the arrangement of the target. Thus, design evaluation may be performed while flexibly responding to a change in arrangement of the target.

Figure 14:
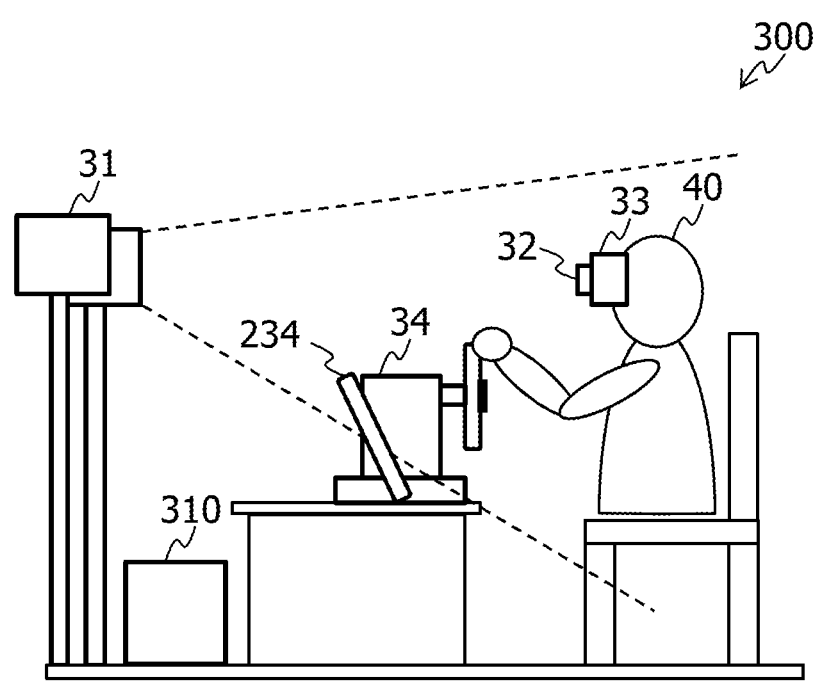
FIG. 14 is a schematic diagram illustrating another configuration of the VR system.

Note that, although the description is given of the case where the VR system includes only one target in the respective embodiments described above, the VR system may include more than one target. For example, a VR system may include a steering wheel model 34 and a tablet terminal 234 simulating a screen of car navigation equipment by combining the first and second embodiments, as in a VR system 300 illustrated in FIG. 14. In this case, an AR marker capable of identifying a target may be attached for each target, and the display control processing in the first embodiment or the display control processing in the second embodiment may be executed for each target according to the type of the target.

Moreover, although the description is given of the case using the VR tracking device 31 of the laser irradiation type in the above embodiments, any other VR tracking technique may be applied, such as a mode using measurement data obtained by an acceleration sensor, a gyro sensor or the like installed in the HMD 33, for example.

Moreover, although the description is given of the case using the AR marker to estimate the position and arrangement of the target in the above embodiments, the disclosure is not limited thereto. Any marker other than the AR marker may be used, or a feature point of the target itself may be detected without using any marker and the position and arrangement of the target may be estimated based on the arrangement of the feature point, and the like.

Moreover, although the description is given of the case where the image taken by the stereo camera is used to estimate the position and arrangement of the AR marker in the above embodiments, the disclosure is not limited thereto. For example, the position and arrangement of the AR marker may be estimated based on the position, size, and tilt (distortion) of the AR marker within an image detected from the image taken by a monocular visible light camera as well as the actual size of the AR marker and the focal position of the camera. Alternatively, an infrared camera may be used. In this case, a visible light camera may be additionally provided to take a background image to be displayed in a VR image.

Note that, in the case of using the stereo camera, two different cameras do not have to be provided to take an image for estimating the position and arrangement of the AR marker and a background image to be displayed in a VR image.

Moreover, in the first embodiment, the description is given of the case where the distance calculated by obtaining three-dimensional positions of the predetermined part of the wearer and of the target is compared with the threshold to determine whether or not the wearer is trying to manipulate or manipulating the target. Meanwhile, in the second embodiment, the description is given of the case where the proximity sensor is used to detect the proximity of the predetermined part of the wearer to the target. However, the disclosure is not limited thereto.

For example, a visual line sensor may be used to detect whether or not the wearer's eyes are directed within a predetermined range including the target, and, if so, it may be determined that the wearer is trying to manipulate or manipulating the target. Alternatively, it may be determined whether or not the direction of the HMD faces the target. Moreover, when no AR marker is detected from an image, when the size of the AR marker is too small within the image (when the AR marker is distant) or the like, it may be determined that the wearer is not trying to manipulate and not manipulating the target. Furthermore, the determination may be made based on a two-dimensional positional relationship between a portion of a hand and a target identified in an image rather than calculating a distance between three-dimensional positions of the predetermined part of the wearer and the target.

Moreover, although the description is given of the case where the display control program 60 or 260 is pre-stored (installed) in the storage unit 53 in the above embodiments, the disclosure is not limited thereto. The program according to the disclosed technology may also be provided as being stored in a storage medium such as a CD-ROM, a DVD-ROM, and a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

estimating, by a first detection device disposed in a real space, a first three-dimensional position of a wearable display device and a first arrangement of the wearable display device including a screen configured to display an image indicating a virtual space including a virtual target object corresponding to a physical object located in the real space, the first detection device tracking the first three-dimensional position and the first arrangement;

estimating, by a second detection device disposed on the wearable display device, a second three-dimensional position of the physical object and a second arrangement of the physical object, the second detection device tracking an area having a specified feature corresponding to the physical object in the real space;

estimating a third three-dimensional position of a specified body part, in the real space, of a person wearing the wearable display device;

determining whether a positional relationship in the real space between the physical object and the specified body part satisfies a predetermined criteria based on the second three-dimensional position and the third three-dimensional position; displaying, on the screen, the virtual target object with a display position and a display arrangement determined based on the second three-dimensional position and the second arrangement when the positional relationship satisfies the predetermined criteria; and displaying, on the screen, the virtual target object with a display position and a display arrangement determined based on the first three-dimensional position and the first arrangement when the positional relationship does not satisfy the predetermined criteria.

2. The non-transitory computer-readable storage medium according to claim 1, wherein the wearable display device is a head mount display device.

3. The non-transitory computer-readable storage medium according to claim 1, wherein the estimating the second three-dimensional position and the second arrangement includes: detecting a three-dimensional position of a marker and an arrangement of the marker placed within the real space in association with the physical object; and estimating the second three-dimensional position and the second arrangement based on the three-dimensional position of the marker and the arrangement of the marker.

4. The non-transitory computer-readable storage medium according to claim 1, wherein the predetermined criteria indicate that a distance between the physical object and the specified body part is equal to or less than a predetermined distance.

5. The non-transitory computer-readable storage medium according to claim 4, wherein the determining determines whether the positional relationship satisfies the predetermined criteria by performing image processing of an image that includes the physical object and the specified body part.

6. The non-transitory computer-readable storage medium according to claim 5, wherein the wearable display device includes a camera device that captures the image; and wherein the displaying displays the virtual target object and a virtual object other than the virtual target object superimposing with the image obtained by the camera device.

7. The non-transitory computer-readable storage medium according to claim 6, wherein the image obtained by the camera device includes a part of the real space corresponding to a field of view of the wearable display device.

8. The non-transitory computer-readable storage medium according to claim 4, wherein the determining determines whether the positional relationship satisfies the predetermined criteria by using a sensor that is attached to at least one of the physical object and the specified body part and that detects proximity of the specified body part to the physical object.

9. The non-transitory computer-readable storage medium according to claim 8, wherein the displaying displays the specified body part of the real space without concealing the virtual target object when the image obtained by the camera device includes the specified body part.

10. The non-transitory computer-readable storage medium according to claim 4, wherein the second detection device is a stereo camera device.

11. The non-transitory computer-readable storage medium according to claim 1, wherein displaying, on the screen, the virtual target object with the display position and display arrangement determined based on the second three-dimensional position and the second arrangement reduces a difference between visual perception and tactile perception of the person viewing the screen while the physical object is being manipulated by the specified body part of the person.

12. A computer-implemented method comprising:

estimating, by a first detection device disposed in a real space, a first three-dimensional position of a wearable display device and a first arrangement of the wearable display device including a screen configured to display an image indicating a virtual space including a virtual target object corresponding to a physical object located in the real space, the first detection device tracking the first three-dimensional position and the first arrangement;

estimating, by a second detection device disposed on the wearable display device, a second three-dimensional position of the physical object and a second arrangement of the physical object, the second detection device tracking an area having a specified feature corresponding to the physical object in the real space;

estimating a third three-dimensional position of a specified body part, in the real space, of a person wearing the wearable display device;

determining whether a positional relationship in the real space between the physical object and the specified body part satisfies a predetermined criteria based on the second three-dimensional position and the third three-dimensional position;

displaying, on the screen, the virtual target object with a display position and a display arrangement determined based on the second three-dimensional position and the second arrangement when the positional relationship satisfies the predetermined criteria; and displaying, on the screen, the virtual target object with a display position and a display arrangement determined based on the first three-dimensional position and the first arrangement when the positional relationship does not satisfy the predetermined criteria.

13. The computer-implemented method according to claim 12, wherein the estimating the second three-dimensional position and the second arrangement includes: detecting a three-dimensional position of a marker and an arrangement of the marker placed within the real space in association with the physical object; and estimating the second three-dimensional position and the second arrangement based on the three-dimensional position of the marker and the arrangement of the marker.

14. The computer-implemented method according to claim 12, wherein the predetermined criteria indicates that a distance between the physical object and the specified body part is equal to or less than a predetermined distance.

15. The computer-implemented method according to claim 14, wherein the determining determines whether the positional relationship satisfies the predetermined criteria by performing image processing of a captured image that includes the physical object and the specified body part.

16. The computer-implemented method according to claim 15, wherein the wearable display device includes a camera device that captures the image; and wherein the displaying displays the virtual target object and a virtual object other than the virtual target object superimposing with the image obtained by the camera device.

17. The computer-implemented method according to claim 14, wherein the determining determines whether the positional relationship satisfies the predetermined criteria by using a sensor that is attached to at least one of the physical object and the specified body part and that detects proximity of the specified body part to the physical object.

18. The computer-implemented method according to claim 12, wherein displaying, on the screen, the virtual target object with the display position and display arrangement determined based on the second three-dimensional position and the second arrangement reduces a difference between visual perception and tactile perception of a user viewing the screen while the physical object is being manipulated by the specified body part.

19. A virtual reality system comprising:
a display control device configured to control display of a virtual reality (VR) space;
a physical object arranged within a real space and having a corresponding virtual object displayed within the VR space;
a VR tracking device configured to provide tracking data of objects within the real space to the display control device; and
a camera attached to a wearable display device configured to obtain at least one image of the real space,
wherein the display control device performs a process comprising:
receiving tracking data from the VR tracking device;
estimating position and arrangement of the wearable display device based on the acquired tracking data;
estimating position of a tip of a specified object to be used to manipulate the target object based on the at least one image from the camera;
detecting an augmented reality (AR) marker within the real space used for estimating position of the target object within the real space;
estimating position and arrangement of the target object based on the detection of the AR marker;
determining a distance between the estimated position of the tip of the specified object and the estimated position and arrangement of the target object;
displaying the VR space including the corresponding virtual object on a display of the wearable display device based on the estimated position and arrangement of the target object estimated using the acquired tracking data when the determined distance is greater than a threshold value; and
displaying the VR space including the corresponding virtual object on the display of the wearable display device based on the estimated position and arrangement of the target object estimated using the detection of the AR marker when the determined distance is smaller than a threshold value,
wherein the displaying the VR space including the corresponding virtual object on the display of the wearable display device based on the estimated position and arrangement of the target object estimated using the detection of the AR marker reduces a difference between visual perception and tactile perception within a mixed reality system when the target object is being physically manipulated while the VR space is displayed.

* * * * *